Sept. 15, 1970   H. E. BERNO   3,528,313
CONTROL CABLE AND ANCHOR STRUCTURE ASSEMBLY
Filed Aug. 15, 1968   4 Sheets-Sheet 3
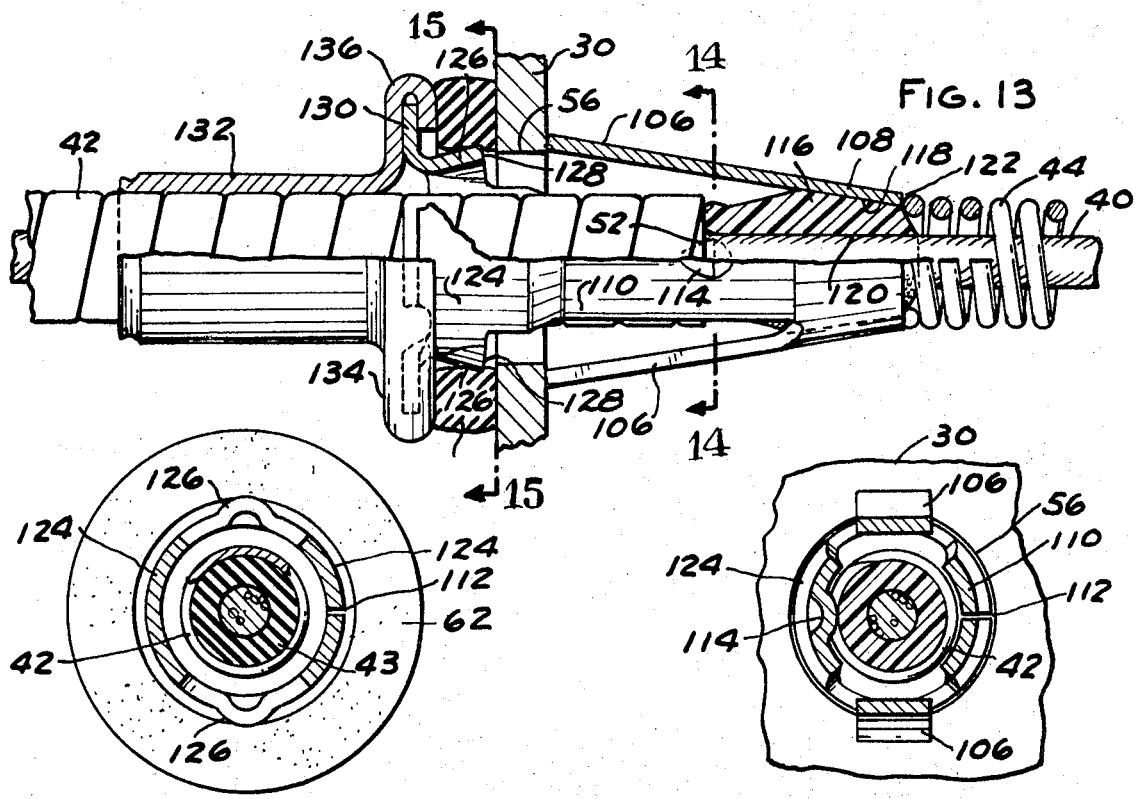
FIG. 13
FIG. 15
FIG. 14
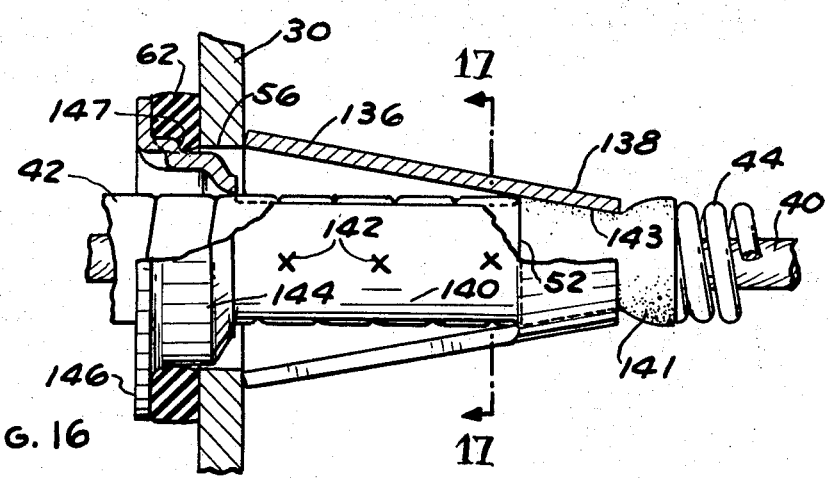
FIG. 16
FIG. 17
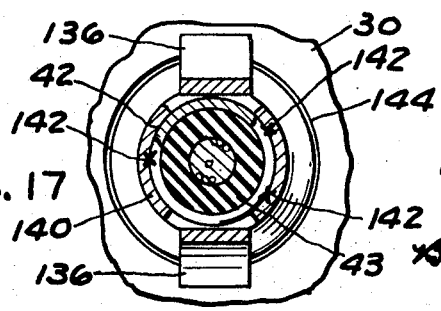
INVENTOR.
HARMOND E. BERNO
BY
Barnes, Kisselle, Raisch & Choate
ATTORNEYS Sept. 15, 1970     H. E. BERNO     3,528,313
CONTROL CABLE AND ANCHOR STRUCTURE ASSEMBLY
Filed Aug. 15, 1968     4 Sheets-Sheet 4

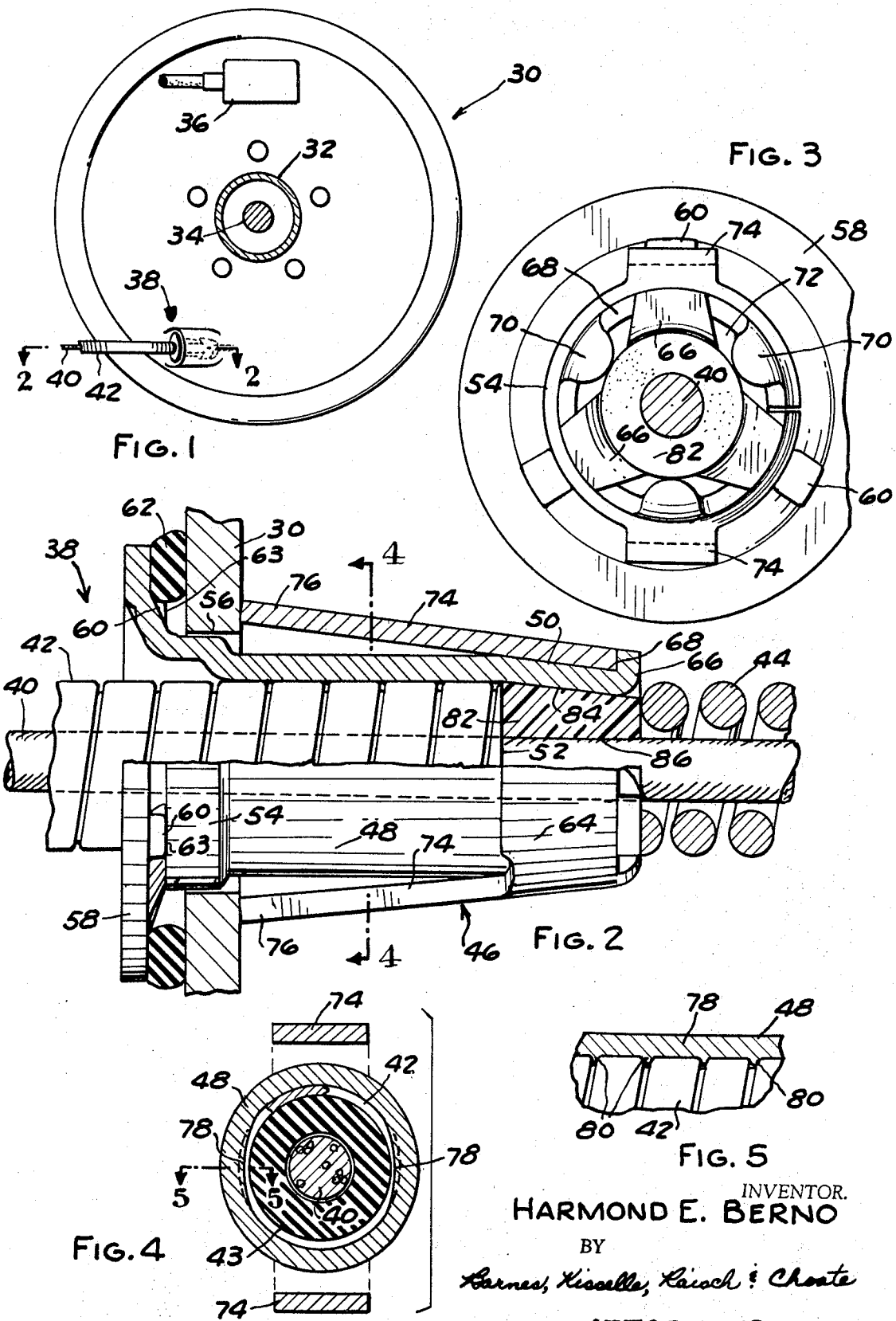

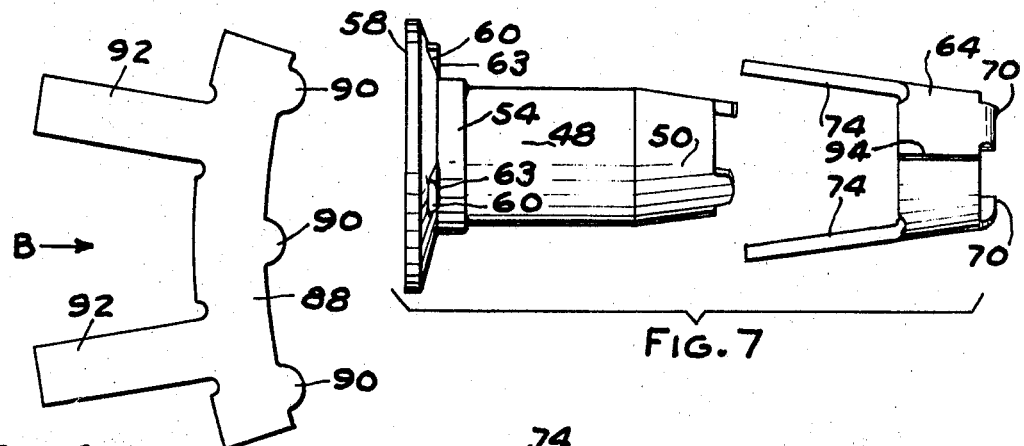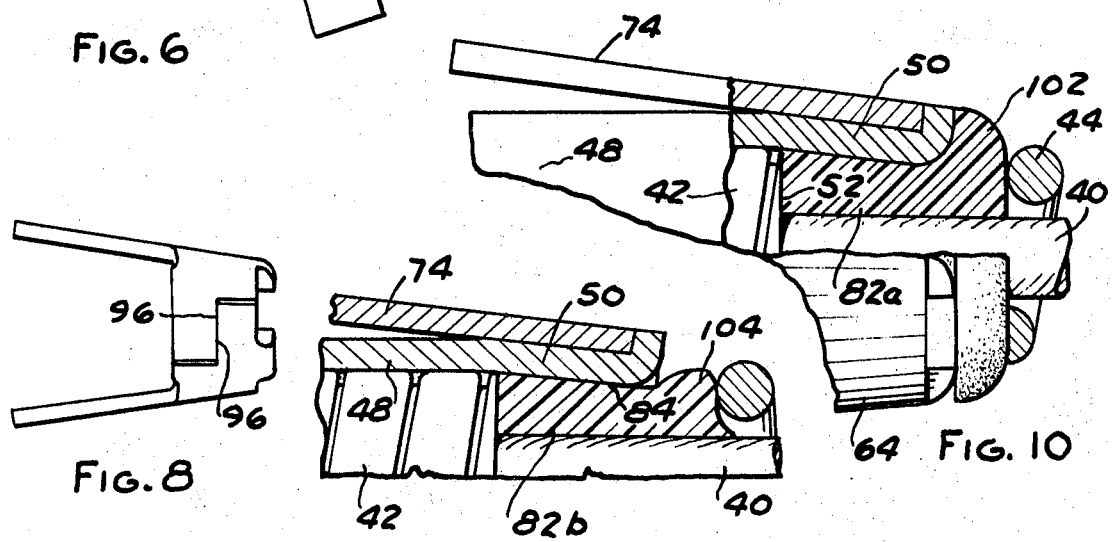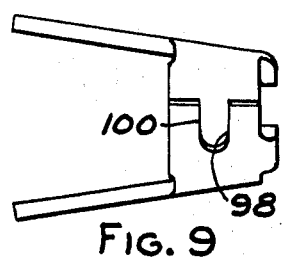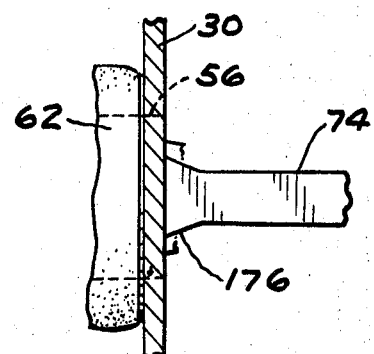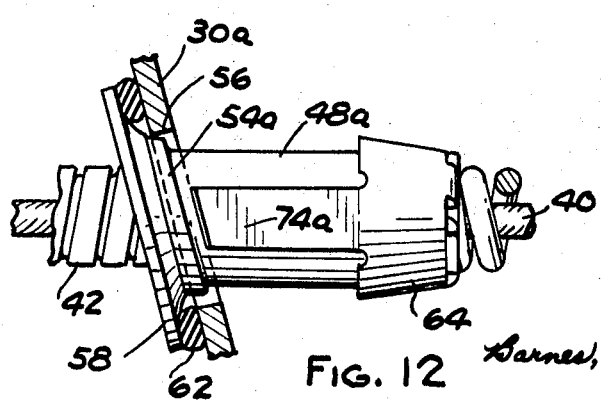

INVENTOR.
HARMOND E. BERNO
BY
Barnes, Kisselle, Raisch & Choate
ATTORNEYS

United States Patent Office 3,528,313
Patented Sept. 15, 1970

3,528,313
CONTROL CABLE AND ANCHOR STRUCTURE ASSEMBLY
Harmond E. Berno, Farmington, Mich., assignor to Pennsylvania Wire Rope Corporation, Williamsport, Pa., a corporation of Pennsylvania
Filed Aug. 15, 1968, Ser. No. 752,906
Int. Cl. F16c 1/10
U.S. Cl. 74—501
23 Claims

ABSTRACT OF THE DISCLOSURE

An anchor on the outer sheath of a control cable for brakes or the like has outwarlly tapered spring fingers which deflect inwardly upon being forced through an opening in a support and then snap outwardly to prevent withdrawal of the sheath from the opening. An abutment on the sheath limits further insertion thereof through the opening. The anchor includes a conical ring on the inserted portion of the sheath, and the spring fingers project therefrom in straight, unbent condition substantially along the conical slant height of the ring. The free ends of the fingers are flattened and/or tapered to increase their widths adjacent the opening. The anchor is fastened to the sheath by welding, crimping, or combinations thereof.

---

This invention relates to an assembly of a control cable movable longitudinally within a sheath and an anchor structure affixed to the sheath by which it can be anchored against substantial longitudinal or lateral movement within an opening in a support. Typically, the cable and sheath are utilized to control parking or emergency brakes on automotive vehicles.

More particularly, the anchor structure is of the type which has spring fingers angled outwardly from the sheath. When the sheath is inserted through an opening, the fingers deflect inwardly to pass therethrough and thereafter snap outwardly to engage portions of the support outwardly of the opening to prevent withdrawal of the sheath from the opening. The anchor has an abutment of larger cross dimension then the opening which limits further insertion of the sheath through the opening after the spring fingers have snapped outwardly.

A major problem with this type of anchor is that the forces which urge the sheath toward withdrawal from the opening tend to bend or buckle the spring fingers; and upon use over a period of time, the fingers break off, thereby destroying the effectiveness of the anchor and sometimes resulting in damage to the brake mechanism. Moreover, anchors of this type are high production items, several being used on most automotive vehicles. Consequently, they must be susceptible of manufacture and assembly on the cable sheath at high production rates and at relatively low cost. Prior anchor structures do not meet these requirements satisfactorily.

The object of this invention is to provide a relatively simple anchor structure having spring fingers which are improved to withstand indefinitely the repeated compressive forces acting thereon without bending or buckling, the anchor structure overall being improved to facilitate high rate, low cost manufacture and assembly with the cable sheath.

Generally, the invention contemplates an anchor structure which incorporates a conical ring around the sheath, the spring fingers projecting from this ring along the slant height thereof and in substantially straight or unbent condition. The ring has an axial extension which is fastened to the sheath by welded connections, crimping, or combinations thereof.

In the drawings:

FIG. 1 is a partly diagrammatic, elevational view illustrating a brake backing plate with a brake cable and anchor structure according to this invention mounted thereon.

FIG. 2 is an enlarged view, partly in elevation and partly in section, on line 2—2 of FIG. 1.

FIG. 3 is an elevational view of the right-hand end of the structure shown in FIG. 2 without the coil spring, rubber seal ring, and backing plate.

FIG. 4 is a sectional view on line 4—4 of FIG. 2.

FIG. 5 is a fragmentary, sectional view on line 5—5 of FIG. 4.

FIG. 6 is a plan view of a blank from which the conical ring and spring fingers are formed.

FIG. 7 is and exploded elevational view of the conical ring and a sleeve element before their assembly.

FIG. 8 is an elevational view of a modified form of the conical ring and spring finger element.

FIG. 9 is an elevational view of another modified form of conical ring and spring finger element.

FIG. 10 is a fragmentary view similar to FIG. 2 but showing a modified form of anchor structure.

FIG. 11 is a fragmentary view similar to FIG. 10 but showing another modified form of anchor structure.

FIG. 12 is a view partly in elevation and partly in section of the anchor structure shown in FIG. 2 modified for use with a sloped backing plate.

FIG. 13 is a view partly in elevation and partly in section illustrating a modified form of anchor structure.

FIG. 14 is a sectional view of line 14—14 of FIG. 13.

FIG. 15 is a sectional view of line 15—15 of FIG. 13.

FIG. 16 is a view partly in elevation and partly in section illustrating another modified form of anchor structure.

FIG. 17 is a sectional view on line 17—17 of FIG. 16.

FIG. 23 is a fragmentary, partly diagrammatic view of another modified form of anchor structure.

Figure 18:
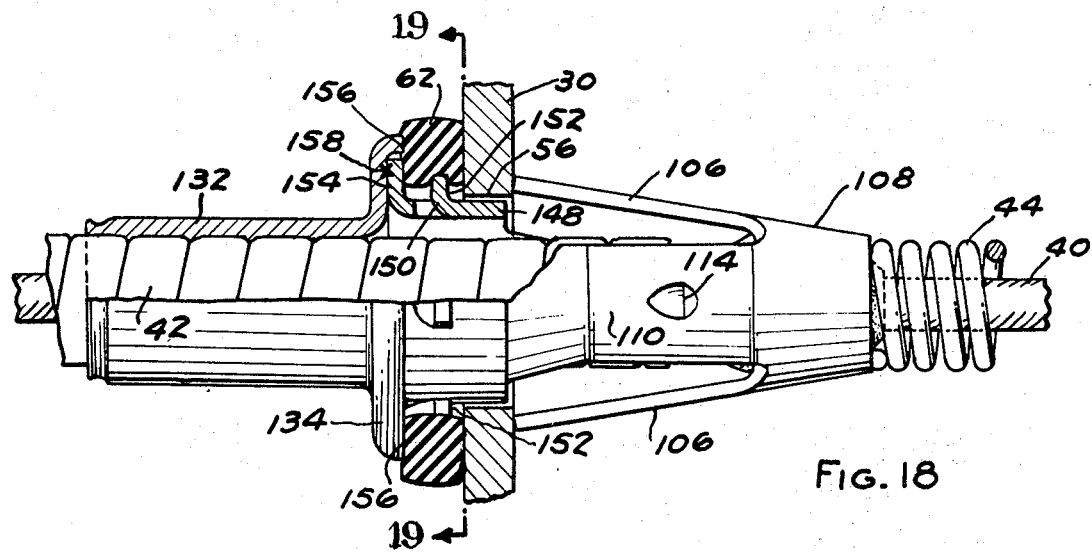
FIG. 18 is a view partly in elevation and partly in section illustrating another modified form of anchor structure.

Shown in FIG. 1 is a brake backing plate 30 mounted on a housing 32 for an axle 34, the brake mechanism (not shown) associated with the backing plate being actuated primarily by a hydraulic cylinder 36. A brake cable and anchor assembly 38 according to this invention is secured to backing plate 30. The assembly includes a brake cable 40 typically made of wire rope longitudinally slidable through an outer sheath 42 typically formed of helically wrapped wire or metal strip. As is conventional, a liner 43 of plastic or the like is provided between cable 40 and sheath 42 (FIG. 4). When cable 40 is pulled to the left as FIG. 2 is viewed, the brake mechanism is shifted against the action of compressed coil spring 44 to apply the brakes; and when the pulling force on the cable is relieved, spring 44 shifts the brake mechanism to release the brakes.

The anchor structure 46 illustrated in FIG. 2 includes a sleeve 48 which fits around sheath 42. Sleeve 48 has an inwardly tapered end portion 50. Cable 40 has an end 52 which engages axially against a reduced diameter portion of the inwardly tapered end, thereby positively limiting the extent to which sheath 42 can be inserted into sleeve 48. Sleeve 48 has a portion 54 of enlarged diameter which fits within an opening 56 in backing plate 30. The sleeve has an end portion 58 flanged outwardly to a diameter greater than opening 56 and adjacent the flange is a resiliently compressible seal ring 62. Flange 58 is deformed at 60 to provide axially disposed abutments 63 which limit the extent to which sheath 48 can be inserted through opening 56.

A conical ring 64 surrounds conical end portion 50 of sleeve 48. Sleeve portion 50 has tabs 66 which are turned radially outwardly to engage end face 68 of ring 64. Ring 64 has tabs 70 (FIG. 3) turned radially inwardly over end 72 of sleeve 48. By this means, sleeve end 50 and ring 64 are secured against relative axial displacement.

Two spring fingers 74 project from ring 64. As illustrated, these spring fingers are disposed in extension of the conical slant height of ring 64 and are substantially straight or unbent along that slant height. The free end portions 76 of fingers 74 may follow the curvature of ring 64 or may be flattened across their width (FIG. 4) as distinguished from following the curvature of ring 64. The flattening of the spring fingers results in their being flared or increased in width at their end portions 76 for a purpose to be described.

Sleeve 48 is formed of a relatively soft material such as a soft steel while ring 64 and fingers 74 are formed of a relatively hard, resilient material such as spring steel. Sleeve 48 has opposite side portions 78 disposed angularly between fingers 74, and these side portions are crimped inwardly so that the metal thereof extrudes inwardly between the convolutions of cable sheath 42 as at 80 (FIG. 5). This securely anchors sleeve 48, ring 64, and fingers 74 onto sheath 42.

A plug 82 of an elastomeric material (FIG. 2), such as rubber or a plastic, is both axially and radially compressed between sheath end 52 and the inner tapered surface 84 of sleeve portion 50. Plug 82 has a central opening 86 through which cable 40 slidably extends.

One convenient and simple method to make ring 64 together with its fingers 74 and tabs 70 is first to form a flat blank B (FIG. 6) having an arcuate body 88 with tab projections 90 and finger projections 92. Blank B is worked by progressive dies to fashion body 88 to circular or conical form to provide ring 64. The dies turn projections 90 inwardly to provide tabs 70 and flatten the ends of projections 92 to complete fingers 74. Where desired to prevent relative axial skewing of the portions of ring 64 adjacent split 94, blank 88 can be provided with circumferentially extending shoulders 96 (FIG. 8) or 98, 100 (FIG. 9) which interengage when the conical ring is formed. Sleeve 48 and the various configurations thereon can be conveniently formed by conventional drawing and stamping operations.

To assemble the cable and anchor structure, end portion 50 of sleeve 48 is inserted into ring 64 and tabs 66 thereon are bent outwardly to fasten the ring and sleeve together. Plug 82 is inserted within sleeve end 50 and seal washer 62 is placed against flange 58. Sheath 42 is inserted into sleeve 48 and abutted against plug 82 and tapered interior 84 of the sleeve. Side portions 78 of sleeve 48 are then crimped inwardly, thereby completing the cable and anchor assembly.

To install the assembly on a backing plate 30 or the like, cable 40 and ring 64 are inserted into opening 56. The taper of ring 64 facilitates piloting of the anchor structure into the opening. By pushing on flange 58, sleeve 48 and fingers 74 are forced into the opening. This deflects the fingers inwardly; and when they have passed through the opening, they snap outwardly to the FIG. 2 position for engagement with portions of backing plate 30 outwardly of opening 56. At this time, seal ring 62 is compressed between flange 58 and the outer face of backing plate 30.

Sleeve enlargement 54 prevents lateral shifting of the anchor structure and cable within opening 56 beyond predetermined limits. Compressed ring 62 tends to limit further insertion of sheath 42 through opening 56 after fingers 74 have snapped outwardly. Shoulders 63 on flange 58, being positioned for engagement against portions of backing plate 30 outwardly of opening 56, positively limit the extent to which such further insertion of sheath 42 can occur.

When cable 40 is pulled to the left, as FIG. 2 is viewed, to apply the brakes, spring 44 exerts increased axial force on plug 82 and therefore on spring fingers 74. Since these fingers are substantially unbent and uncurved radially inwardly or outwardly, the compressive forces thereon act in a generally straight, columnar direction; and the tendency of the fingers to bend, buckle, or flex is minimized. As a result, even though cable 40 is pulled and released in a great many cycles over a long period of time, fingers 74 do not weaken and break off.

It is desirable to dispose fingers 74 as nearly perpendicular as possible relative to backing plate 30. Their angle relative to the backing plate is governed by the diameter of opening 56, limitations on the length of the fingers, and the extent to which the finger ends must extend outwardly of opening 56 to insure against their slipping out through the opening should a condition arise in which all of the tolerances or clearances accumulate in one direction lateral of opening 56. The intimate fit between ring 64 and sheath end 50 minimizes internal clearances within the anchor structure. In addition, by flattening finger ends 76, their effective width is increased, thereby decreasing the possibility of their slipping out through opening 56. These two factors make it possible to decrease the angle of fingers 74, i.e., to bring them more nearly perpendicular with respect to plate 30.

In conventional cable anchors, it has been necessary to provide three spring fingers to prevent withdrawal thereof through an opening 56. The factors discussed above make it possible to reduce the number of spring fingers 74 to two as illustrated.

Compressed seal ring 62 prevents dirt, water, and other foreign matter from penetrating through opening 56 toward the brake mechanism. Plug 82, being radially constricted by taper surface 84 around cable 40, forms an effective wiper and seal which contains lubricant within sheath 42 and excludes foreign material from entering the sheath. Plug 82 eliminates any cavity which might trap dirt in abrasive engagement against cable 40.

The form of the invention illustrated in FIG. 10 is generally similar to that described above except that seal plug 82a has an end portion 102 which extends radially outwardly to form a cap over the interengaged ends of ring 64 and sleeve portion 50. The form of the invention illustrated in FIG. 11 is, in general, similar to that illustrated in FIG. 10 except that seal plug 82b has an end portion 104 which projects radially outwardly to a diameter greater than inner diameter 84 of sleeve portion 50 but without forming a complete cap over the end of the anchor structure, as in FIG. 10.

FIG. 12 illustrates a modification of the invention similar to the FIG. 2 form except that spring fingers 74a, sleeve 48a, and enlargement 54a are modified for use with a backing plate 30a sloped with respect to cable sheath 42 rather than perpendicular thereto.

FIGS. 13–15 illustrate another form of the invention similar to the forms described above in that spring fingers 106 are integral with conical ring 108 and extend along the slant height thereof. In this modification, sleeve 110 is also integral with ring 108. The entire finger, ring, and sleeve assembly is formed as a split ring, the split being illustrated at 112 (FIG. 14). Sheath end 52 is seated axially against an inward dimple 114 in sleeve 110 to position sheath 42 axially relative to fingers 106. Seal plug 116 is axially and radially compressed between sheath end 52 and the tapered inner surface 118 of ring 108 so that opening 120 in the seal plug sealingly and wipingly engages cable 40. End face 122 of ring 108 is positioned for metal-to-metal contact with spring 44.

Sleeve 110 has an enlargement 124 (FIGS. 14, 15) which fits within opening 56; and outwardly of plate 30, the sleeve has struck-up ears 126 which provide shoulders 128 positioned for engagement with plate 30 outwardly of opening 56 and thereby form positive stops analogous to shoulders 63 in the FIG. 2 form. An end portion of sleeve 110 is flanged outwardly at 130.

In this form of the invention, sleeve 110 is formed of the same hard spring steel as fingers 106 and ring 108 and cannot be effectively crimped around sheath 42 as is sleeve 48. Instead, a soft metal collar 132 around the sheath is swaged inwardly so that the metal thereof penetrates between the convolutions of sheath 42. This collar is provided with a flange 134 engaged against flange 130 and having its outer peripheral portion return bent into gripping engagement around flange 130 at 136. To assemble the parts, flange 136 is bent around flange 130, plug 116 and then sheath 42 are inserted into sleeve 110 so that sheath end 52 engages dimple 114, and collar 132 is then swaged inwardly.

The form of the invention illustrated in FIGS. 16 and 17 is, in general, similar to that illustrated in FIG. 13 in that spring fingers 136, conical ring 138, and sleeve 140 are all integral. Sleeve 140 is welded directly to cable sheath 42 at 142 after seal plug 141 and sheath 42 are inserted therein and sheath end 52 is engaged against ring interior 143. This may be accomplished by the use of a laser welder. While, at the time of this invention, laser welding equipment is too expensive for economical use in assembling the anchor structure and cable sheath, nevertheless such direct welding is within the ambit of the invention. Sleeve 140 has an enlargement 144 which fits within plate opening 56; and the end of the sleeve is flanged outwardly at 146. Seal ring 62 is disposed between flange 146 and plate 30. Enlargement 144 has shoulders 147 positioned for engagement with plate 30 outwardly of opening 56 and thereby providing positive stops analogous to shoulders 63 in FIG. 2 form.

Figure 19:
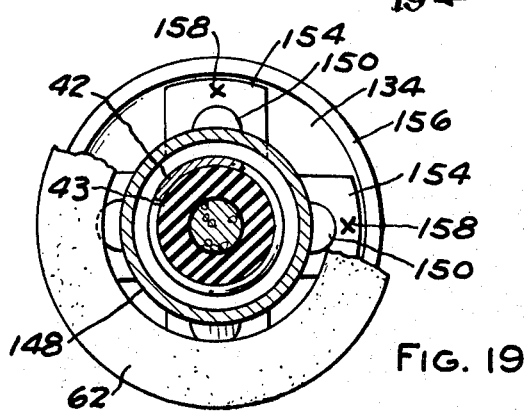
FIG. 19 is a sectional view on line 19—19 of FIG. 18.
Figure 20:
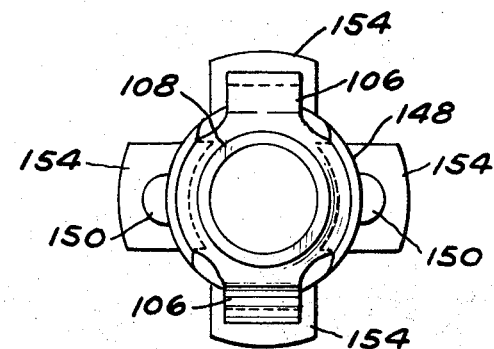
FIG. 20 is an end view of the conical ring and spring finger element used in the FIG. 18 form.

The form of the invention illustrated in FIGS. 18, 19 and 20 is, in general, similar to that of FIG. 13 except that sleeve 110 has an enlargement 148 thereon which fits within plate opening 56. Tabs 150 are struck out from enlargement 148 to provide positive abutment shoulders 152 for limiting insertion of sheath 42 into opening 56. The end of sleeve 110 has outward flanging in the form of four lugs 154. Flange 134 on collar 132 has a peripheral portion which is turned over the outer edges of lugs 154 to provide an axially disposed, circumferentially continuous surface 156. Flange 134 is pot welded to lugs 154 at 158. Circumferential surface 156, by engagement with seal ring 62, excludes moisture and dirt from entering opening 56.

Figures 21, 22:
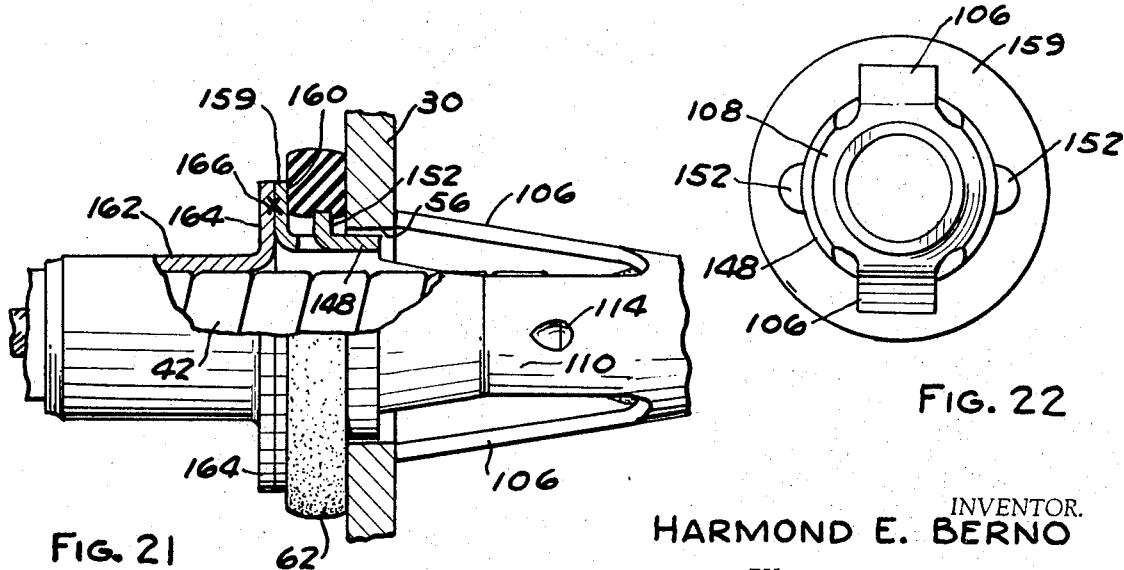
FIG. 21 is a view partly in elevation and partly in section illustrating another modified form of anchor structure.
FIG. 22 is an end view of the conical ring and spring finger element utilized in the FIG. 21 form.

The modified form of anchor structure illustrated in FIGS. 21 and 22 is generally similar to the FIG. 18 form except that the flange 159 at the end of sleeve 110 is circumferentially continuous to provide a continuous surface 160 for sealing engagement with seal ring 62. Collar 162, swaged into gripping engagement around sheath 42, has outward flanging which may comprise angularly spaced lugs 164 and these lugs are spot welded to flange 158 at 166.

The assembly procedure for the FIGS. 18 and 21 forms of the invention is similar to that for the FIG. 13 form except that the first step is forming spot welds 158, 166, respectively.

The modified form of anchor structure shown in FIG. 23, is, in general, similar to those described above, except that spring fingers 174 are tapered or flared outwardly as at 176 adjacent their free ends. This tapering may be provided instead of or in addition to the outward flaring or widening of the finger ends incident to flattening them. So tapering the fingers further decreases the possibility of their slipping out through opening 56. Fingers 174 may be provided on any of the conical rings 64, 108, etc., in the above described forms of the invention. The extent of the outward taper shown in FIG. 23 is somewhat exaggerated for purposes of illustration.

The functional characteristics of the various modifications of FIGS. 8–23 are similar to those of the FIG. 2 form of the invention described above.

While the invention has been disclosed with reference to controlling emergency or parking brakes in an automotive vehicle, it will be apparent from the foregoing disclosure that the invention is adapted for general use in controlling elements of widely diverse types of apparatus and equipment.

What is claimed is:

1. In an assembly of a control cable longitudinally movable within a sheath and an anchor on the sheath having spring finger means resiliently deflectable inwardly upon insertion through an opening and snappable outwardly to prevent withdrawal of the sheath through the opening, the anchor having means providing an obstruction which limits further insertion of said sheath after said finger means has snapped outwardly, improved structure which comprises, means forming a conical ring fastened adjacent a portion of said sheath to be inserted through an opening, said spring finger means projecting from said ring substantially along the conical slant height thereof and oppositely to the insertion direction of said sheath.

2. The structure defined in claim 1 wherein said finger means is integral with said ring.

3. The structure defined in claim 1 wherein said ring is axially split and has circumferentially extending portions interengaged to prevent relative skewing of the ring portions adjacent the split.

4. The structure defined in claim 1 wherein said finger means comprises a plurality of angularly spaced fingers, said means providing said obstruction comprising outward projections on a sleeve, said sleeve having portions engaged around said sheath portion and disposed within the axial extent of said fingers, and means fastening together said sleeve and sheath portions, said fastening means being angularly disposed between said fingers.

5. The structure defined in claim 4 wherein said fastening means comprises a region of said sleeve portion deformed inwardly into gripping engagement with said sheath portion.

6. The structure defined in claim 4 wherein said fastening means comprises a welded connection between said sleeve and sheath portions.

7. The structure defined in claim 4 wherein said ring, fingers, and sleeve are integral.

8. The structure defined in claim 1 wherein said ring comprises nested inner and outer conical elements, said finger means projecting from the outer element, said inner element having an axial extension which comprises a member of said anchor.

9. The structure defined in claim 8 wherein said nested elements are secured together by inwardly turned tabs on the outer element and outwardly turned tabs on the inner element, the tabs on each element engaging a portion of the other element.

10. The structure defined in claim 1 wherein said portion of said sheath has an end, a seal of resiliently distortable material being axially compressed between said end and the interior of said ring, said seal being radially compressed within said ring, said seal having an axially extending opening through which said cable longitudinally movably extends, the portions of said seal defining said opening being engaged against said cable to form a seal around said cable.

11. The structure defined in claim 10 wherein said seal has radial dimensioning no greater than that of the contiguous ring interior.

12. The structure defined in claim 10 wherein said seal has an end portion which projects out of an end portion of said ring, said seal portion extending radially outwardly of and contiguous to said end portion of said ring.

13. The structure defined in claim 10 wherein said ring has an axial extension provided with an inward projection against which the end of said sheath abuts to position said sheath portion axially relative to said ring and finger means.

14. The structure defined in claim 1 and including in addition means forming an axial extension of said ring, said extension having a first outwardly projecting portion which forms said means providing said obstruction, said extension having a second outwardly projecting portion spaced axially further from said ring than said first portion, said anchor including a collar gripped around said sheath at a location axially spaced from said sheath portion, said collar having an outward projection which is welded to said second outwardly projecting portion of said extension.

15. The structure defined in claim 14 wherein said first outwardly projecting portion comprises a tab struck outwardly from said extension.

16. The structure defined in claim 14 wherein said second outwardly projecting portion comprises a plurality of tabs turned outwardly adjacent an end portion of said extension, said outwardly projecting portion of said collar comprising a circumferentially continuous flange on said sleeve, said flange having an outer peripheral portion turned axially over the outer extremities of said tabs and terminating in an axially disposed end face, and an axially compressible seal ring surrounding said extension and positioned for sealing engagement with said end face.

17. The structure defined in claim 14 wherein said second outwardly projecting portion of said extension comprises a circumferentially continuous flange at an end of said extension, said flange having an axially disposed face, and an axially compressible seal ring surrounding a portion of said extension adjacent said flange and positioned for sealing engagement with said face.

18. The structure defined in claim 17 wherein said outwardly projecting portion of said collar comprises a plurality of outwardly turned tabs adjacent an end portion thereof.

19. The structure defined in claim 1 wherein said finger means has free end portions flared outwardly to a width greater than that of a portion contiguous thereto.

20. The structure defined in claim 19 wherein said spring finger means consists of two spring fingers disposed substantially diametrically opposite one another.

21. The structure defined in claim 19 wherein said contiguous portions of said fingers follow the curvature of said cone across their widths, said free end portions being flattened to provide said greater width.

22. The structure defined in claim 19 wherein said free end portions are tapered outwardly to provide said greater width.

23. The structure defined in claim 19 wherein said contiguous portions of said fingers follow the curvature of said cone across their widths, said free end portions being flattened and also being tapered outwardly to provide said greater width.

References Cited

UNITED STATES PATENTS

| | | | |
|---|---|---|---|
| 2,128,040 | 8/1938 | Conners | 74—501 |
| 2,869,905 | 1/1959 | Bratz | 74—501 |
| 3,139,768 | 7/1964 | Biesecker | 74—501 |
| 3,221,572 | 12/1965 | Swick | 74—501 |
| 3,366,405 | 1/1968 | Sevrence | 74—501 |

WESLEY S. RATLIFF, JR., Primary Examiner